United States Patent
Tachikawa

(10) Patent No.: US 8,237,982 B2
(45) Date of Patent: Aug. 7, 2012

(54) IMAGE PROCESSING APPARATUS AND METHOD READING IMAGE DATA FROM STORAGE TO ROTATE ORTHOGANALLY AND CORRECT FOR BEAM SCAN LINE DISTORION

(75) Inventor: Tomohiro Tachikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 538 days.

(21) Appl. No.: 12/492,408

(22) Filed: Jun. 26, 2009

(65) Prior Publication Data

US 2009/0323113 A1    Dec. 31, 2009

(30) Foreign Application Priority Data

Jun. 30, 2008 (JP) ................. 2008-171744

(51) Int. Cl.
    *H04N 1/409* (2006.01)
    *H04N 1/23* (2006.01)
    *H04N 1/21* (2006.01)
    *G06K 15/02* (2006.01)

(52) U.S. Cl. ............ 358/1.7; 358/3.26; 358/1.16

(58) Field of Classification Search .......... 358/1.7, 358/1.9, 3.26, 501, 401, 296, 300, 302, 1.16, 358/1.17; 347/129–132, 225, 246–255; 399/31, 399/32, 51, 177
See application file for complete search history.

(56) References Cited

U.S. PATENT DOCUMENTS

| | | | |
|---|---|---|---|
| 3,697,683 A | | 10/1972 | Gates et al. |
| 5,299,310 A | * | 3/1994 | Motoyama ............ 358/1.17 |
| 5,537,515 A | * | 7/1996 | Yokoyama et al. ............ 358/1.9 |
| 6,118,463 A | * | 9/2000 | Houki et al. .................. 347/116 |
| 6,134,022 A | * | 10/2000 | Yamamoto et al. ............ 358/1.9 |
| 6,370,175 B1 | * | 4/2002 | Ikeda et al. .................... 347/246 |
| 6,642,950 B2 | * | 11/2003 | Otose et al. .................... 347/247 |

FOREIGN PATENT DOCUMENTS

| | | |
|---|---|---|
| EP | 753959 A2 | 1/1997 |
| GB | 2303757 A | 2/1997 |
| JP | 03223987 A | 10/1991 |
| JP | 11306343 A | 11/1999 |
| JP | 2004-170755 A | 6/2004 |
| JP | 2006050402 A | 2/2006 |
| JP | 2007088928 A | 4/2007 |
| JP | 2007193787 A | 8/2007 |

* cited by examiner

*Primary Examiner* — Scott A Rogers

(74) *Attorney, Agent, or Firm* — Canon U.S.A., Inc. IP Division

(57) ABSTRACT

An image forming apparatus includes setting means configured to set writing start address for each line of image data, based on information for correcting distortion of a scanning line, correction means configured to read the image data from storage means on a line-by-line basis in a second direction orthogonal to the first direction of the image, and execute correction processing to write the image data in the storage means from the writing start address set by the setting means on a line-by-line basis in the second direction of the image, output means configured to read the image data corrected by the correction means from the storage means on a line-by-line basis in the first direction of the image to output the image data.

13 Claims, 20 Drawing Sheets

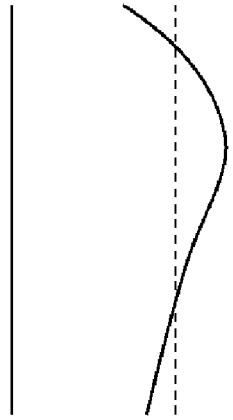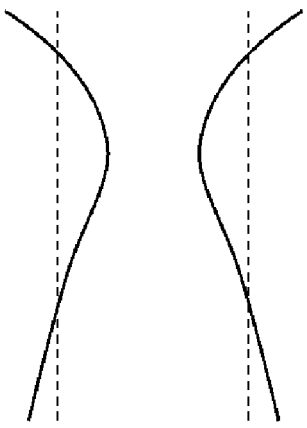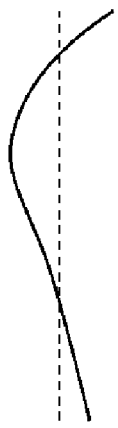
FIG. 6A  IDEAL SCANNING LINE
FIG. 6B  ACTUAL SCANNING LINE
FIG. 6C  CURVE USED FOR CORRECTION
FIG. 6D  CURVE USED FOR CORRECTION (AFTER ROTATION OF 90°)

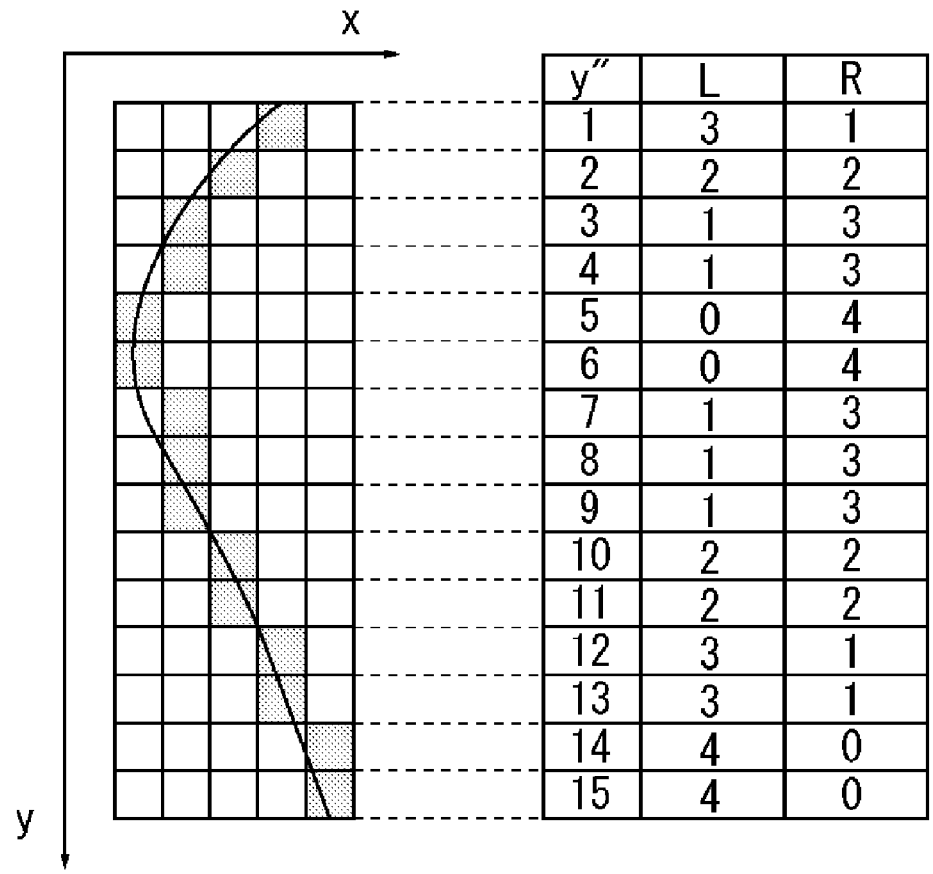

IMAGE PROCESSING APPARATUS AND METHOD READING IMAGE DATA FROM STORAGE TO ROTATE ORTHOGANALLY AND CORRECT FOR BEAM SCAN LINE DISTORION

BACKGROUND OF THE INVENTION

1. Field of the Invention

The present invention relates to an image processing apparatus and a method for controlling the same.

2. Description of the Related Art

An image forming apparatus executes an exposure process by irradiating a charged photosensitive member with a laser beam. The image forming apparatus develops an electrostatic latent image generated by the exposure using toner, and transfers the developed image to a sheet to fix it.

In an exposure unit of such an image forming apparatus, a laser scanning line is ideally a straight line parallel to an axis of the photosensitive member. However, an error in attaching position or tilting of a light source or the photosensitive member may cause the laser scanning line to be distorted as compared with a straight line parallel to the axis of the photosensitive member.

Japanese Patent Application Laid-Open No. 2004-170755 discusses a method for correcting distortion of a laser scanning line. The method discussed in Japanese Patent Application Laid-Open No. 170755 measures distortion of the laser scanning line by using a sensor, corrects bitmap image data to cancel the distortion, and performs image formation based on the corrected image data.

Referring to FIGS. 18 to 20, the method for correcting the image data will be described.

FIG. 18 illustrates a data structure of image data before it is subjected to correction processing according to a conventional art. In FIG. 18, the image data is bitmap data formed into a matrix structure.

FIG. 19 illustrates a status where the image data is subjected to correction processing at a specific line according to the conventional art. The distorted laser scanning line (dark line on FIG. 19) is distorted by as much as two pixels on each side of the ideal (straight, parallel) scanning line. The image data is corrected (by an amount shown by the arrows in FIG. 19, which represent a correction value for each scanned pixel) for each line during printing as illustrated in FIG. 19, and then output to an exposure unit. As illustrated in FIG. 19, at each line, for each pixel, processing for replacing a pixel present on an ideal scanning line with a pixel present on an actual scanning line is executed.

FIG. 20 illustrates a data structure of image data after it has been subjected to correction processing according to the conventional art. In FIG. 20, the image data is distorted symmetrically to an actual scanning line in a sub-scanning direction. Use of this image data cancels distortion at the actual scanning line for printing, enabling acquisition of an electrostatic image similar to that exposed by an ideal scanning line by the exposure unit.

The ideal scanning line is a scanning line indicating, in a state where mounting positions of the exposure unit and the photosensitive member to the apparatus are ideally fixed, an irradiated position on the photosensitive member when the exposure unit irradiates one line of the photosensitive member with the laser beam.

The actual scanning line is a scanning line indicating, in a state where the exposure unit and the photosensitive member are actually mounted to the apparatus, an irradiated position on the photosensitive member when the exposure unit irradiates one line of the photosensitive member with the laser beam.

According to the method discussed in Japanese Patent Application Laid-Open No. 2004-170755, however, the image data is corrected in the sub-scanning direction for a pixel of each line. Thus, implementing the method discussed therein needs line buffers of a number of lines larger than a distortion width of a laser scanning line.

For example, when a distortion width of a laser scanning line is equal to N lines, line buffers that can store image data of the N lines are necessary. Securing many line buffers increases a memory capacity and a circuit size for correcting the image data, resulting in higher costs.

SUMMARY OF THE INVENTION

The present invention is directed to an improved image processing apparatus and a method for controlling the same.

According to an aspect of the present invention, an image processing apparatus includes a storage unit, an exposure unit configured to irradiate a photosensitive member with a beam according to image data, an input unit configured to input image data on a line-by-line basis in a first direction of an image to write the image data in the storage unit, a setting unit configured to set a writing start address for each line of the image data input by the input unit, the writing start address being based on information for correcting distortion of a scanning line created by the beam, a correction unit configured to read the image data input by the input unit from the storage unit on a line-by-line basis in a second direction orthogonal to the first direction of the image, and execute correction processing to write the image data in the storage unit from the writing start address set by the setting unit on a line-by-line basis in the second direction of the image, an output unit configured to read the image data corrected by the correction unit from the storage unit on a line-by-line basis in the first direction of the image to output the image data, and a control unit configured to control the exposure unit to irradiate a photosensitive member with a beam according to the image data output by the output unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of embodiments of the invention.

FIGS. 6A to 6D illustrate correction scanning lines according to the first exemplary embodiment.

FIGS. 7A and 7B illustrate correction information according to the first exemplary embodiment.

DETAILED DESCRIPTION OF THE EMBODIMENTS

Various exemplary embodiments, features, and aspects of the present invention is hereinbelow described in detail with reference to the drawings.

Figure 1:
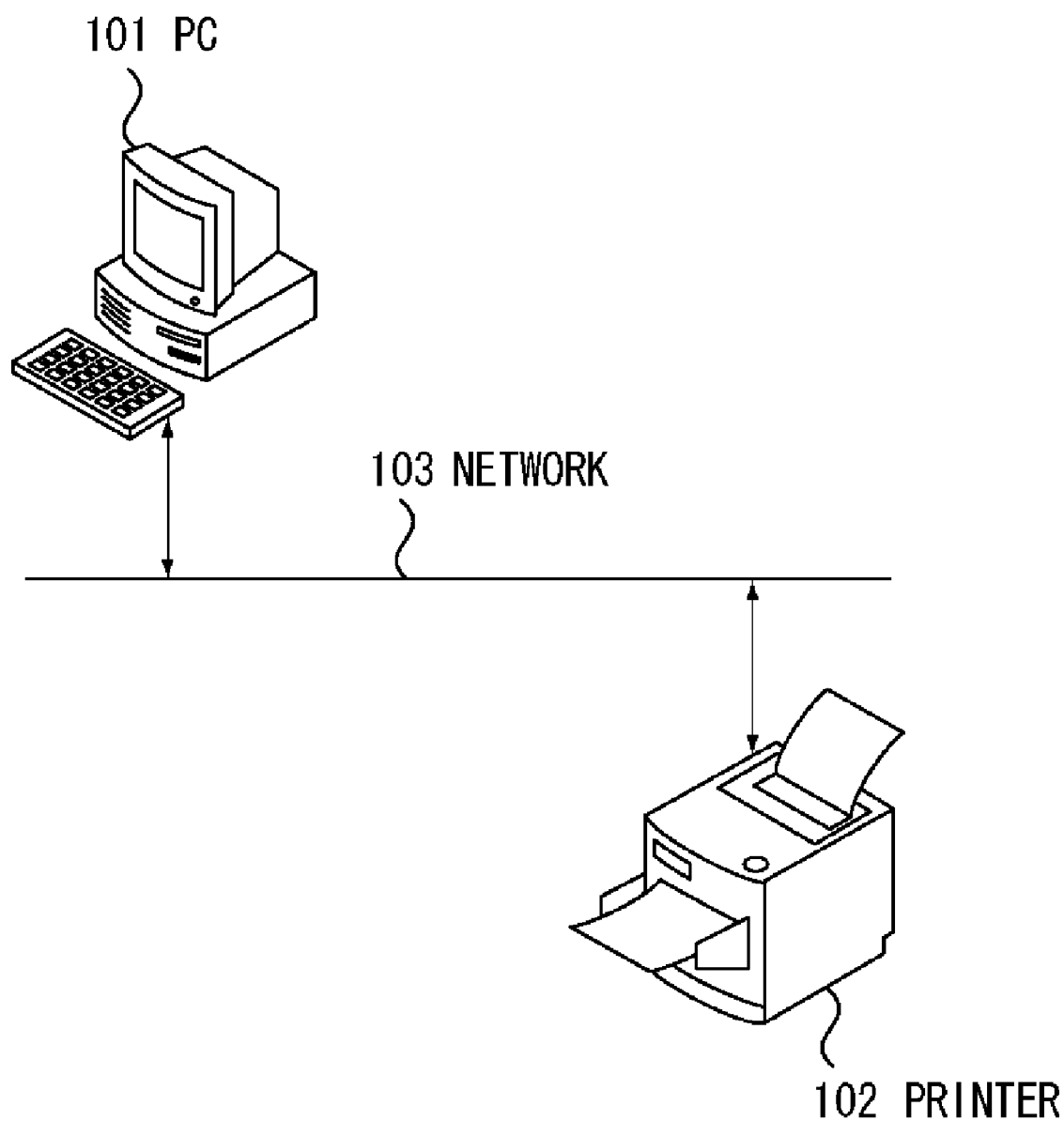
FIG. 1 illustrates a configuration of a system according to a first exemplary embodiment.

FIG. 1 illustrates a configuration of a system according to a first exemplary embodiment. A PC 101 and a printer 102 are interconnected via a network 103 to transfer data such as image data between each other. The PC 101 and the printer 102 may be interconnected locally.

Figure 2:
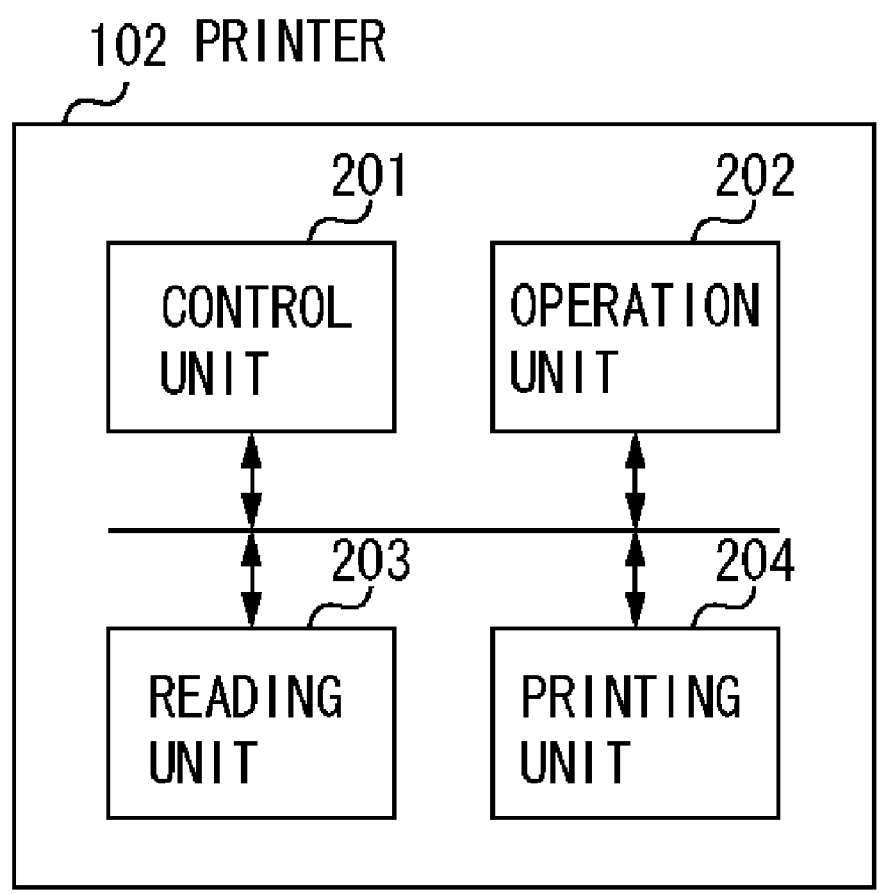
FIG. 2 is a block diagram illustrating a configuration of a printer according to the first exemplary embodiment.

FIG. 2 is a block diagram illustrating a configuration of the printer 102 according to the first exemplary embodiment. A control unit 201 will be described below in detail referring to FIG. 3. An operation unit 202 includes a display unit and an input unit, provides an operation screen of the printer 102 to a user by the display unit, and receives various operations of the printer 102 from the user by the input unit.

A reading unit 203 reads image data from a document to enter it to the control unit 201. A printing unit 204 executes image formation on an output sheet based on the image data processed by the control unit 201.

Figure 3:
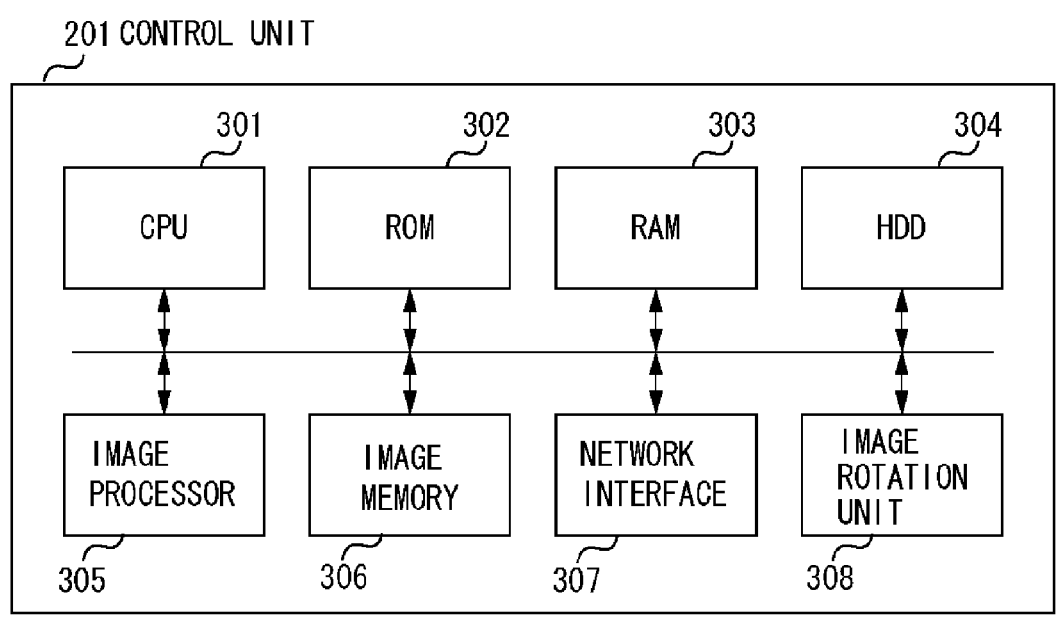
FIG. 3 is a block diagram illustrating a control unit in detail according to the first exemplary embodiment.

FIG. 3 is a block diagram illustrating the control unit 201 according to the first exemplary embodiment in detail. A CPU 301 controls components 202 to 204 of the printer 102 and components 302 to 307 of the control unit 201 based on a program loaded in a RAM 303.

A Read Only Memory (ROM (nonvolatile storage medium)) 302 stores a boot program executed by the CPU 301. In the Read Only Memory (RAM (volatile storage medium)) 303, an OS or an application program to be executed by the CPU 301 is loaded from a HDD 304.

The HDD (nonvolatile storage medium) 304 stores the OS or the application program executed by the CPU 301.

An image processor 305 executes various image processes for image data stored in an image memory 306. The image memory (volatile storage medium) 306 temporarily stores image data input from the reading unit 203 or a network interface 307.

The network interface 307 transmits or receives image data to/from an external apparatus such as the PC 101. An image rotation unit 308 rotates an image by converting an arrangement of image data.

Figure 4:
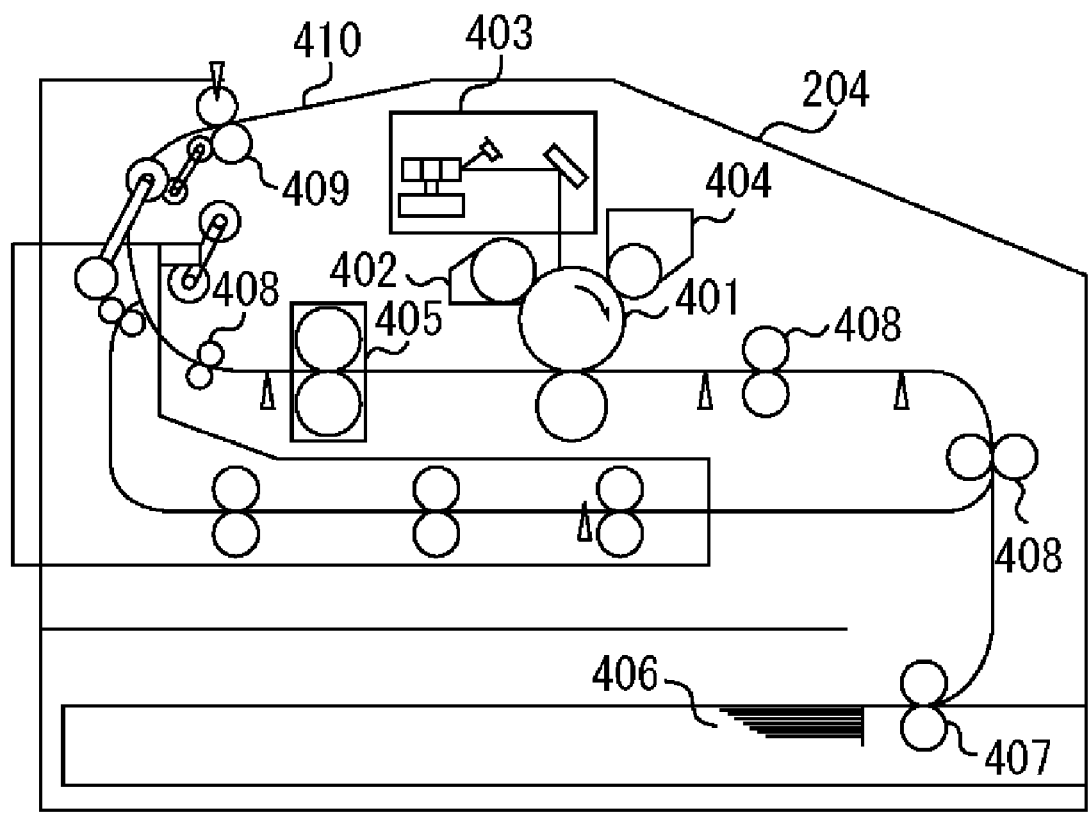
FIG. 4 illustrates a printing unit in detail according to the first exemplary embodiment.

FIG. 4 illustrates the printing unit 204 according to the first exemplary embodiment in detail. Image forming units 401 to 405 execute image formation. Sheet conveying units 406 to 410 execute sheet conveying. A photosensitive member 401 transfers a developer image to a sheet. A charging unit 402 charges the photosensitive member 401. An exposure unit 403 executes exposure by irradiating the charged photosensitive member 401 with a laser beam to generate an electrostatic latent image.

A developing unit 404 develops the electrostatic latent image generated on the photosensitive member 401 by using a developer such as toner to generate a developer image. A fixing unit 405 fixes the developer image transferred to the sheet by the photosensitive member 401 on the sheet.

A paper feed tray 406 stores sheets to be printed. A sheet feed roller 407 feeds sheets from the paper feed tray 406. At least one convey roller 408 conveys sheets in the printing unit 204. A discharge roller 409 discharges sheets to a discharge tray 410. The discharge tray 410 stores printed sheets.

Printing processing in the printing unit 204 is carried out as follows under control of the CPU 301. First, the exposure unit 403 generates an electrostatic latent image on the photosensitive member 401 charged by the charging unit 402, and the developing unit 404 develops the electrostatic latent image using a developer such as toner to generate a developer image.

A sheet in the paper feed tray 406 is fed by a feeding operation of the sheet feed roller 407. The photosensitive member 404 transfers the developer image to the sheet, and the fixing unit 405 fixes the developer image on the sheet.

The sheet having the developer image fixed thereon by the fixing unit 405 is discharged to the discharge tray 410 by a discharging operation of the discharge roller 409.

Figure 5:
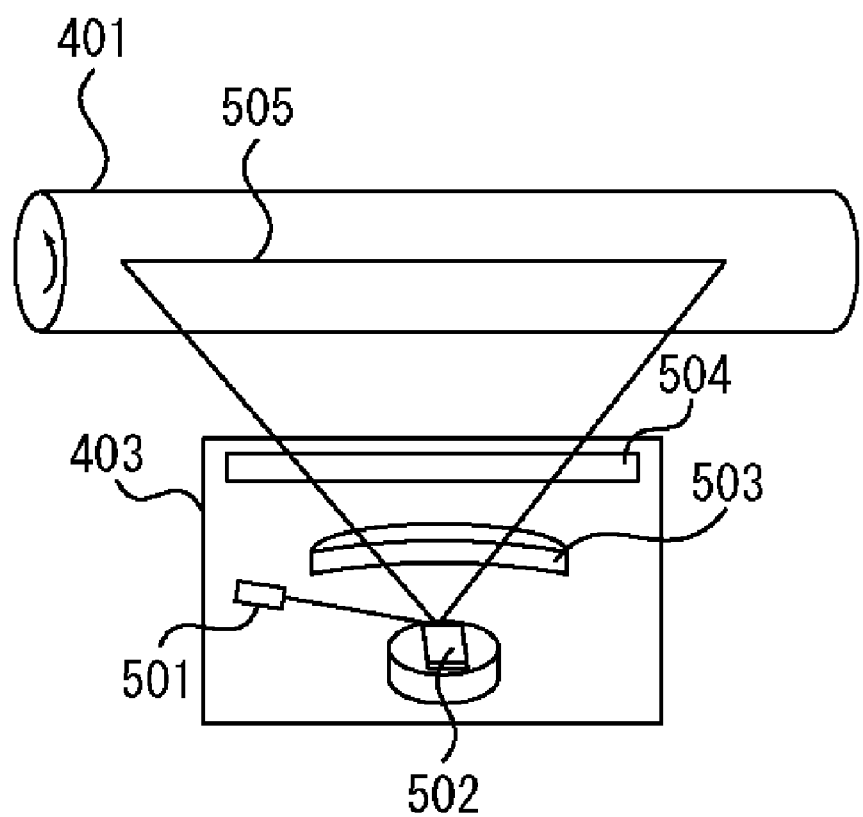
FIG. 5 illustrates exposure being executed by an exposure unit in detail according to the first exemplary embodiment.

FIG. 5 illustrates an exposure process executed by the exposure unit 403 according to the first exemplary embodiment in detail. A light source 501 emits laser beams. A rotary polygonal mirror 502 irradiates the photosensitive member 401 with a laser beam emitted from the light source 501 as a scanning line 505. An f-θ lens 503 adjusts an optical length of a laser beam from the light source 501 to the scanning line 505.

A reflecting mirror 504 guides the laser beam passed through the f-θ lens to the scanning line 505. The scanning line 505 is a line where the laser beam emitted from the light source 501 is applied to the photosensitive member 401 via the rotary polygonal mirror 502, the f-θ lens 503, and the reflecting mirror 504.

The exposure unit 403 performs exposure processing as follows under control of the CPU 301. First, the light source 501 emits a laser beam to generate an electrostatic latent image of an image on the photosensitive member 401 based on image data.

The laser beam emitted from the light source 501 is reflected by the rotary polygonal mirror 502, passed through the f-θ lens 503, and reflected by the reflecting mirror 504 to be applied to the scanning line 505. The laser beam is applied to the scanning line 505 and the photosensitive member 401 rotates, thereby executing exposure for the photosensitive member 401.

A direction of the scanning line 505 corresponds to a main scanning line for printing, and a rotational direction of the photosensitive member 401 corresponds to a sub-scanning direction for printing. In other words, if a scanning line in the case of scanning in parallel with an axis of a drum when one line is scanned with a laser beam is a main scanning line, a direction orthogonal to the main scanning line is a sub-scanning line.

The scanning line 505 is preferably a straight line parallel to an axis (such as the rotational axis) of the photosensitive member 401. However, the scanning line 505 may be distorted due to the deviation of attaching positions or tilting of the components 401, 403, and 501 to 504.

FIGS. 6A to 6D illustrate correction scanning lines according to the first exemplary embodiment. FIG. 6A illustrates an ideal scanning line. The ideal scanning line is a line indicating, when mounting positions of the exposure unit and the photosensitive member to the apparatus are ideally fixed, an irradiation position of the photosensitive member with a laser beam when the exposure unit provides laser beams for one line to the photosensitive member.

FIG. 6B illustrates an actual scanning line. The actual scanning line is a scanning line indicating, in the actually mounted state of the exposure unit and the photosensitive member to the apparatus, an irradiation position of the photosensitive member with a laser beam when the exposure unit provides laser beams for one line to the photosensitive member.

FIG. 6C illustrates a curve used for correction. FIG. 6D illustrates a curve after the curve used for correction is rotated forward (counterclockwise) by 90°.

Normally, the scanning line is preferably straight as shown in FIG. 6A. Actually, however, the scanning line is frequently distorted as shown in FIG. 6B. Thus, to print an image with no distortion, by using a curve having a phase reverse to that of the scanning line of FIG. 6B, as shown in FIG. 6C, distortion of the scanning line may be canceled.

According to the present exemplary embodiment, as shown in FIG. 6D, distortion of the scanning line is corrected by using a curve obtained by rotating the curve of FIG. 6C by 90°.

FIGS. 7A and 7B illustrate correction information according to the first exemplary embodiment. This correction information is stored in the HDD 304 when the printer 102 was manufactured, and used when correction processing of step S104 is executed for image data described below.

FIG. 7A illustrates a curve corresponding to FIG. 6D of the printing unit 204 rasterized as a bitmap. FIG. 7B illustrates predetermined correction information generated according to FIG. 7A.

In FIG. 7A, a number of bits in an x direction is set equal to or more than an x-direction width of the curve of FIG. 6D, and a number of bits in a y direction is set equal to a y-direction length of the curve of FIG. 6D.

In FIG. 7B, for each line (y) of main scanning, a number of white pixels (L) to be added to a left side of image data for the correction and a number of white pixels (R) to be added to a right side of the image data for the correction are stored. At each line, the number of white pixels L corresponds to a number of pixels of the left side of black pixels indicating the curve in FIG. 7A, and the number of white pixels R corresponds to a number of pixels of the right side of black pixels indicating the curve in FIG. 7B. These numbers of white pixels on either side (L, R) of the curve representing the actual scanning line are presented in tabular form in FIG. 7B.

At each line, a value of L+1 corresponds to an address of a black pixel indicating the curve in FIG. 7A, and to a writing start address of corrected image data in correction processing of the image data described below. Thus, the predetermined correction information contains a plurality of correction values varied from one line to another of the image data.

In the present exemplary embodiment, an x-axis direction of the image data corresponds to a first direction, and a y-axis direction of the image data corresponds to a second direction. In the present exemplary embodiment, the x-axis direction of the image data corresponds to a main scanning direction of an irradiation beam for printing, and the y-axis direction of the image data corresponds to a sub-scanning direction of the irradiation beam for printing.

Figure 8:
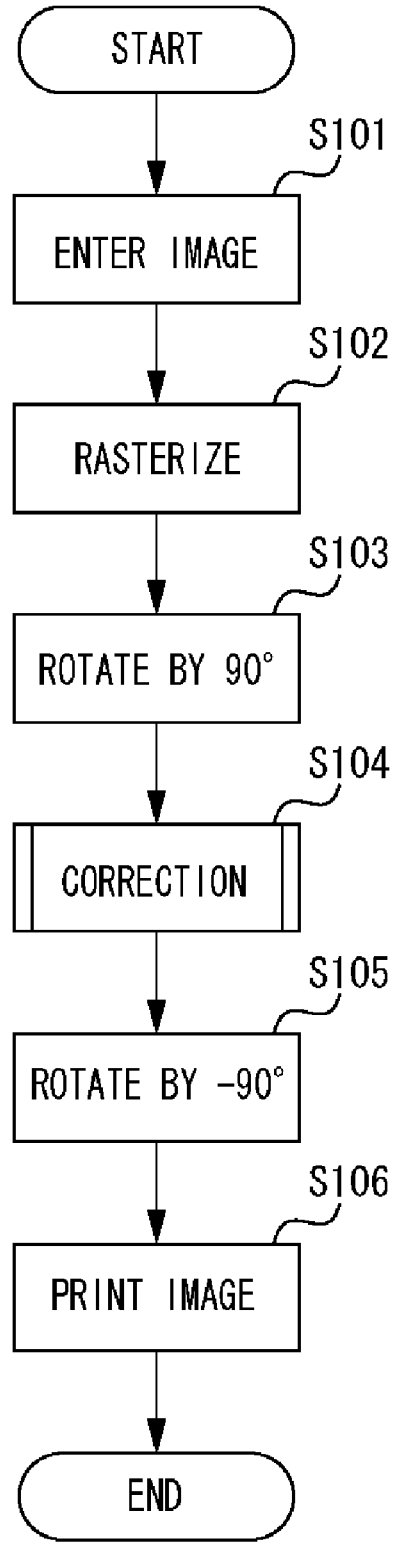
FIG. 8 is a flowchart illustrating an operation of the printer according to the first exemplary embodiment.

FIG. 8 is a flowchart illustrating an operation of the printer 102 according to the first exemplary embodiment. The operation illustrated in FIG. 8 is realized by causing the CPU 301 to read a program stored in the HDD 304 to the RAM 303 to execute the program.

First, in step S101, the reading unit 203 or the network interface 307 is controlled to input image data. The input image data is stored in the HDD 304.

In the present exemplary embodiment, the image data input in step S101 is rasterized in step S102. However, if the image data input in step S101 has been rasterized, the rasterization of the image in step S102 may be omitted. This includes, for example, a case where the image data read by the reading unit 203 is input. In this case, the image data input in step S101 is written in the image memory 306 on a line-by-line basis in the x-axis direction without being rasterized in step S102.

In step S102, the image processor 305 is controlled to rasterize the image data input in step S101 from data of a page description language to bitmap data. The rasterized image data is written in the image memory 306 on a line-by-line basis in the x-axis direction (corresponding to a writing direction of FIG. 10).

Figure 10:
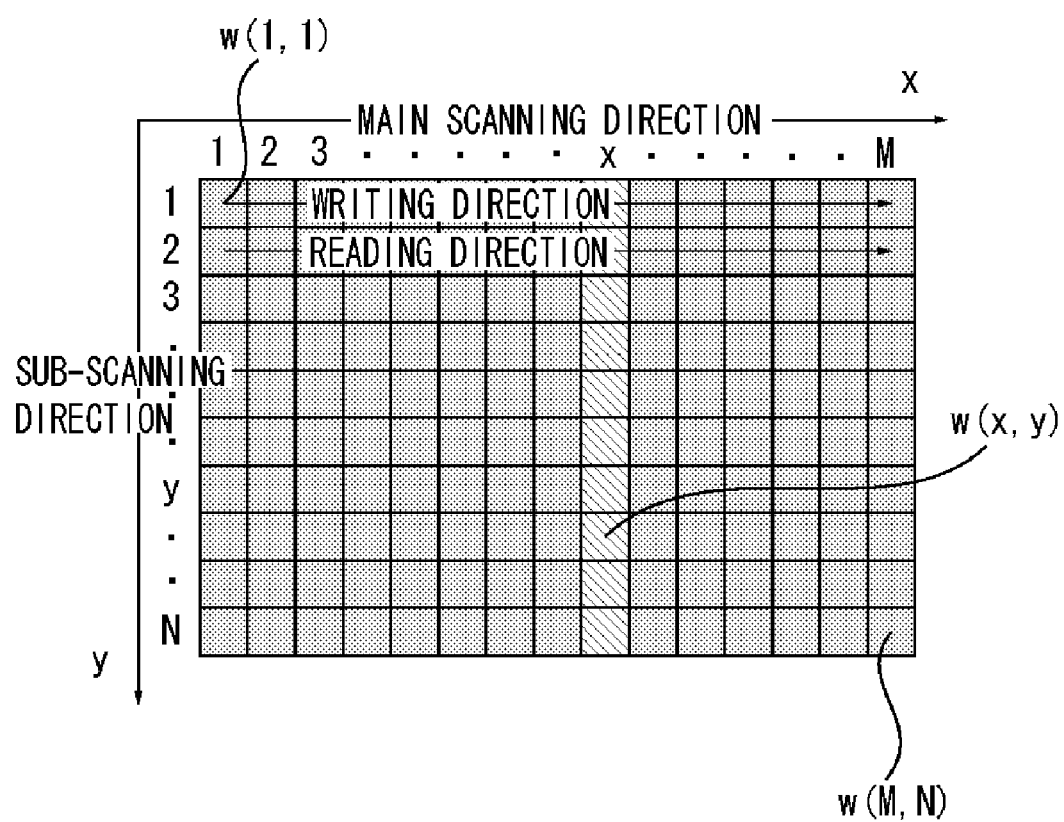
FIG. 10 illustrates a data structure of image data input in step S101 of FIG. 8 according to the first exemplary embodiment.

FIG. 10 illustrates a data structure of the image data rasterized in step S102. The image data has coordinates of a two-dimensional matrix of $1 \leq x \leq M$ and $1 \leq y \leq N$. A value w (x, y) indicating brightness is stored corresponding to each coordinate.

In the present exemplary embodiment, correspondence between coordinates of each pixel of the image data and an address in the image memory 306 is represented as follows: $a = k + (x-1) + M \times (y-1)$, where "a" is an address in the image memory 306, "k" is an address for starting writing of the image data, and (x, y) is coordinates of each pixel of the image data (maximum value of x is M, and maximum value of y is N). In other words, among pixels of the image data, pixels adjacent to each other in the x-axis direction are continuously stored in adjacent addresses in the image memory 306.

The present exemplary embodiment will be described by setting "w" to 256 gradations of $0 \leq w \leq 255$. However, "w" may be other gradations. In the case of "w" having 256 gradations of $0 \leq W \leq 255$, 0 corresponds to black, and 255 corresponds to white.

The present exemplary embodiment will be described by taking an example where an image is monochrome image. However, the image may be a color image. In the case of a color image, corresponding to each coordinate, a value r(x, y) indicating brightness of red, a value g(x, y) indicating brightness of green, and a value b(x, y) indicating brightness of blue are stored.

In step S103 of FIG. 8, the image rotation unit 308 is controlled to rotate in the forward direction (counterclockwise) by 90° the image data rasterized in step S102. In the rotation of step S103, the image data is read from the image memory 306 by a line unit in the x-axis direction (or y-axis direction) (corresponding to the reading direction of FIG. 10).

The image data is temporarily stored in a line buffer (not illustrated), and written on a line-by-line basis in the image memory in the y-axis direction (or x-axis direction) (corresponding to a writing direction of FIG. 1).

Figure 11:
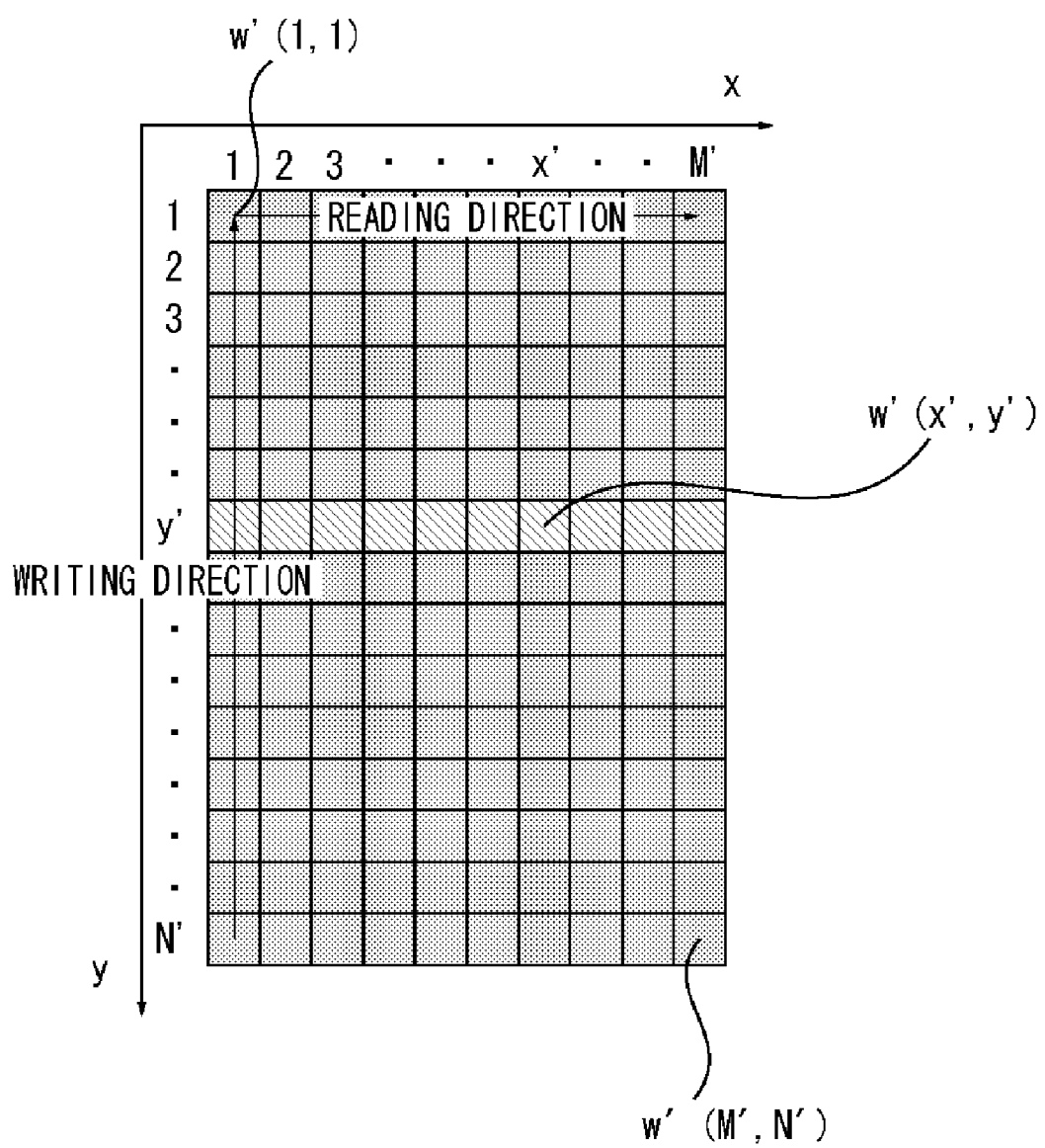
FIG. 11 illustrates a data structure of image data subjected to rotation processing in step S103 of FIG. 8 according to the first exemplary embodiment.

FIG. 11 illustrates a data structure of the image data rotated in step S103. The image data has coordinates of a two-dimensional matrix of $1 \leq x' \leq M'$ and $1 \leq y' \leq N'$, each coordinate stores a corresponding value $w'(x', y')$ indicating brightness.

Rotating the image data forward by 90° establishes relationships of $x'=y$, $y'=M-x+1$, $M'=N$, $N'=M$, and $w'(x', y')=w(x, y)$. In other words, in step S103, for each pixel of the image data, the coordinate of the x-axis direction and the coordinate of the y-axis direction are converted (changed) into each other. This conversion corresponds to a first conversion.

In step S104 of FIG. 8, the image processor 305 is controlled to execute correction processing for the image data rotated forward (counterclockwise) by 90° in step S103. In the correction processing of step S104, the image data is read by a line image from the image memory 306 in the x-axis direction (corresponding to a reading direction of FIG. 11). The image data is temporarily stored in the line buffer (not illustrated), subjected to correction processing, and written on a line-by-line basis in the image memory 306 in the x-axis direction (corresponding to a writing direction of FIG. 12). Step S104 will be described in detail referring to FIG. 9 below.

Figure 12:
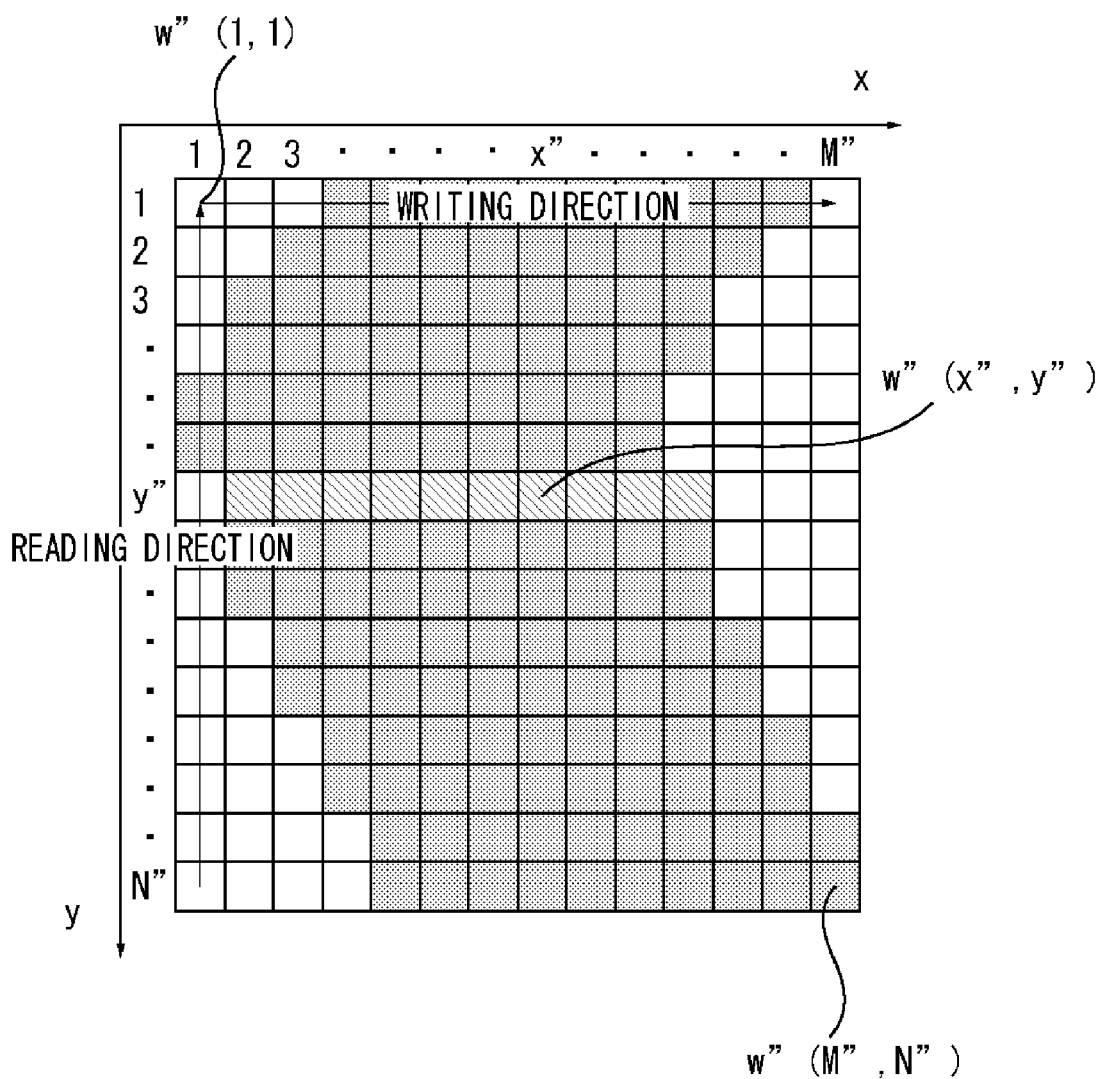
FIG. 12 illustrates a data structure of image data subjected to correction processing in step S104 of FIG. 8 according to the first exemplary embodiment.

FIG. 12 illustrates a data structure of the image data corrected in step S104. The image data has coordinates of a two-dimensional matrix of $1 \leq x'' \leq M''$ and $1 \leq y'' \leq N''$. Each coordinate stores a corresponding value $w''(x'', y'')$ indicating brightness. Correcting the image data establishes relationships of $x''=y$, $y'=M-x+1$, $M''=M'$, $N''=N'$, $w''(x'', y'')=w'(x', y')$.

In step S105 of FIG. 8, the image rotation unit 308 is controlled to rotate the image data corrected in step S104 backward (clockwise) by 90°. In the rotation of step S105, the image data is read on a line-by-line basis from the image memory 306 in the y-axis direction (or x-axis direction) (corresponding to a reading direction of FIG. 12). The image data is temporarily stored in the line buffer (not illustrated), and written on a line-by-line basis in the image memory 306 in the x-axis direction (or the y-axis direction) (corresponding to a writing direction of FIG. 13).

Figure 13:
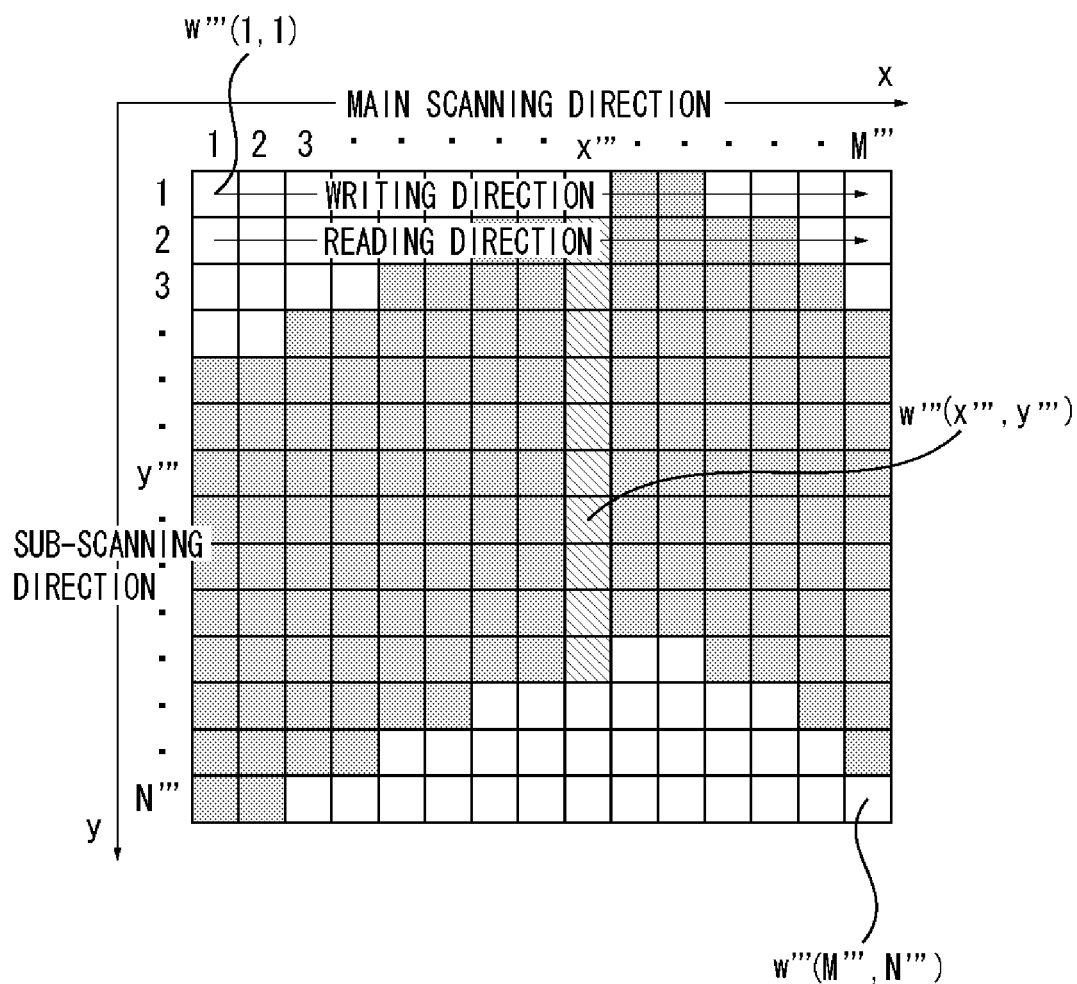
FIG. 13 illustrates a data structure of image data subjected to rotation processing in step S105 of FIG. 8 according to the first exemplary embodiment.

FIG. 13 illustrates a data structure of the image data rotated in step S105. The image data has coordinates of a two-dimensional matrix of $1 \leq x''' \leq M'''$ and $1 \leq y''' \leq N'''$, and each coordinate stores a corresponding value $w'''(x''', y''')$ indicating brightness.

Rotating the image data backward by 90° establishes relationships of $x'''=y''$, $y'''=M''-x''+1$, $M'''=N''$, $N'''=M''$, and $w'''(x''', y''')=w''(x'', y'')$. In other words, in step S105, for each pixel of the image data, the coordinate of the x-axis direction and the coordinate of the y-axis direction are converted (changed) into each other. This conversion corresponds to a second conversion.

In step S106 of FIG. 8, the printing unit 204 is controlled to execute printing based on the image data rotated backward by 90° in step S105. The image data to be printed is read on a line-by-line basis from the image memory 306 in the x-axis direction (corresponding to a reading direction of FIG. 13). The printing processing of step S106 is carried out as follows.

First, the exposure unit 403 generates an electrostatic latent image on the photosensitive member 401 charged by the charging unit 402. The developing unit 404 develops the electrostatic latent image by a developer such as toner to generate a developer image. The sheet in the paper feed tray 406 is fed by a feeding operation of the sheet feed roller 407.

The photosensitive member 401 transfers the developer image to the sheet, and the fixing unit 405 fixes the developer image on the sheet. The sheet having the developer image fixed thereon by the fixing unit 405 is discharged to the discharge tray 410 by a discharging operation of the discharge roller 409.

Figure 9:
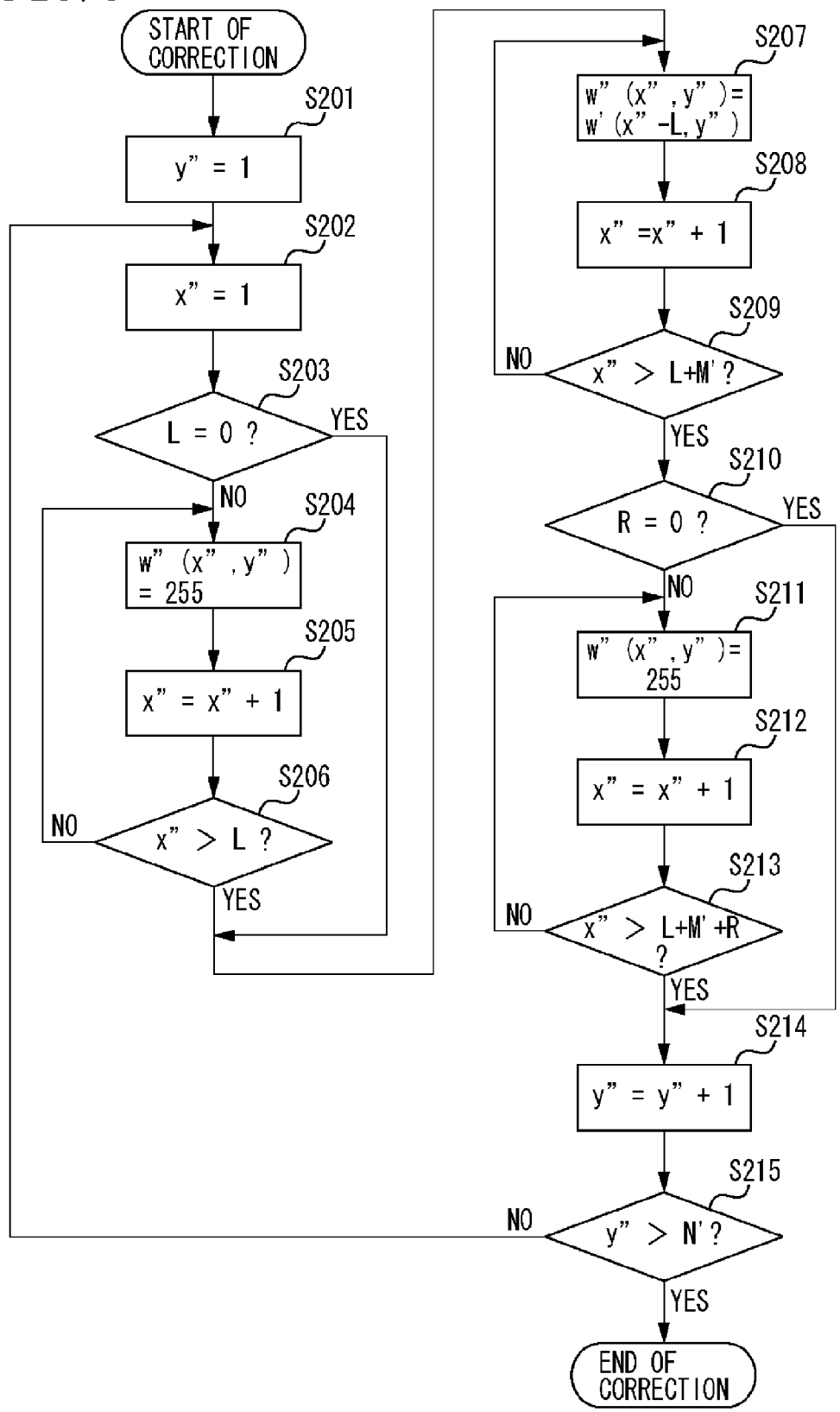
FIG. 9 is a flowchart illustrating correction processing in detail according to the first exemplary embodiment.

FIG. 9 is a flowchart illustrating the correction processing in S104 according to the first exemplary embodiment in detail.

First, in step S201, "1" is substituted for y". In step S202, "1" is substituted for x". In step S203, whether L corresponding to y" is "0" is determined based on the correction information of FIG. 7B. If L corresponding to y" is determined to be 0 in step S203 (YES in step S203), then, the process proceeds to step S207. If L corresponding to y" is determined not to be "0" in step S203 (NO in step S203), then, the process proceeds to step S204.

In step S204, "255" representing white is substituted for w" (x", y"). In step S205, x" is incremented by 1.

In step S206, whether x" is larger than L corresponding to y" is determined based on the correction information of FIG. 7B. If x" is determined to be larger than L corresponding to y" in step S206 (YES in step S206), then, the process proceeds to step S207. If x" is determined not to be larger than L corresponding to y" in step S206 (NO in step S206), then, the process returns to step S204.

In step S207, w"(x"−L, y") is substituted for w"(x", y"). In step S208, x" is incremented by 1.

In step S209, whether x" is larger than a value obtained by adding L corresponding to y" and a maximum value M' of x' is determined based on the correction information of FIG. 7B. If x" is determined to be larger than the value obtained by adding L corresponding to y" and the maximum value M' of x' in step S209 (YES in step S209), then, the process proceeds to step S210.

If x" is determined not to be larger than the value obtained by adding L corresponding to y" and the maximum value M' of x' in step S209 (NO in step S209), then, the process returns to step S207. Repeating steps S207 to S209 enables sequential storage of values of w(x"−L, y") in w'''(x''', y''') with x"=L+1 set as a head address and x"=L+M' set as a tail address at a y" line.

In step S210, whether R corresponding to y" is "0" is determined based on the correction information of FIG. 7B. If R corresponding to y" is determined to be "0" in step S210 (YES in step S210), then, the process proceeds to step S214. If R corresponding to y" is determined not to be "0" in step S210 (NO in step S210), then, the process proceeds to step S211.

In step S211, "255" representing white is substituted for w"(x", y"). In step S212, x" is incremented by 1.

In step S213, whether x" is larger than a value obtained by adding L corresponding to y", the maximum value M' of x', and R corresponding to y" is determined based on the correction information of FIG. 7B. If x" is determined to be larger than the value obtained by adding L corresponding to y", the maximum value M' of x', and R corresponding to y" in step S213 (YES in step S213), then, the process proceeds to step S214. If x" is determined not to be larger than the value obtained by adding together L corresponding to y", then, the maximum value M' of x' and R corresponding to y" in step S213, the process returns to step S211.

In step S214, y" is incremented by 1.

In step S215, whether y" is larger than a maximum value N' of y' is determined. If y" is determined to be larger than the maximum value N' of y' in step S215 (YES in step S215), the processing is finished. If y" is determined not to be larger than the maximum value N' of y' in step S215 (NO in step S215), then, the process proceeds back to step S202.

An advantage of the present exemplary embodiment is that when distortion of the scanning line of the laser beam is corrected, the number of line buffers used for correcting the image data can be reduced.

Another advantage of the present exemplary embodiment is that when distortion of the scanning line of the laser beam is corrected, the circuit used for correcting the image data can be configured simply and inexpensively.

A further advantage of the present exemplary embodiment is that since data can be continuously read and written according to continuous addresses in correction processing, load of the correction processing can be reduced.

A configuration of an apparatus according to the second exemplary embodiment is similar to that of the first embodiment described above referring to FIG. 1 to FIGS. 7A and 7B, and thus description thereof will be omitted.

In the present exemplary embodiment, an x-axis direction of image data corresponds to a first direction, and a y-axis direction of the image data corresponds to a second direction. In the present exemplary embodiment, the x-axis direction of the image data corresponds to a main scanning direction of an irradiation beam for printing, and the y-axis direction of the image data corresponds to a sub-scanning direction of the irradiation beam for printing.

Figure 14:
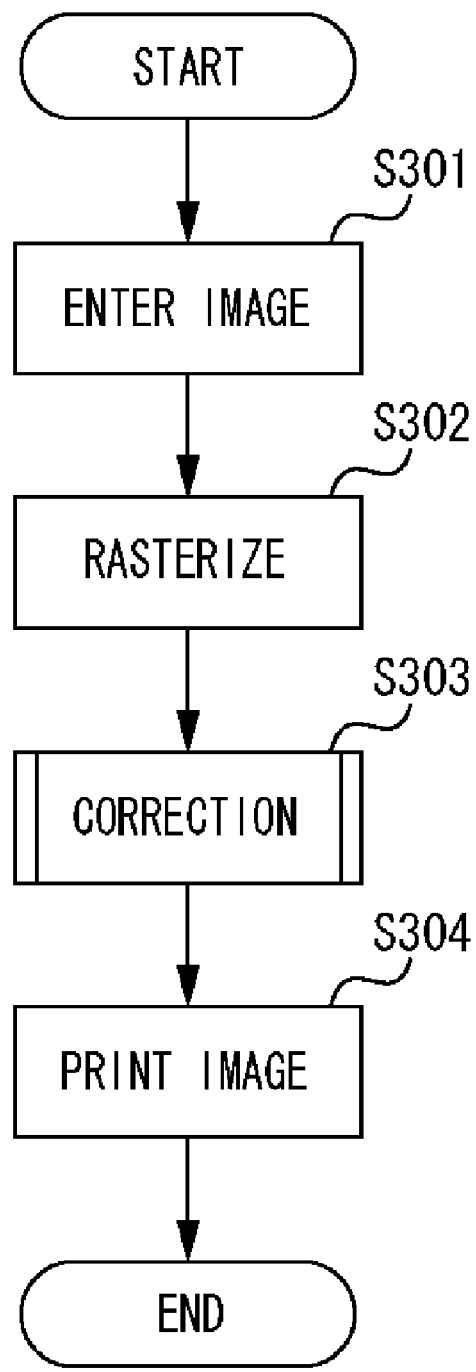
FIG. 14 is a flowchart illustrating an operation of a printer according to a second exemplary embodiment.

FIG. 14 is a flowchart illustrating an operation of a printer 102 according to the second exemplary embodiment. The operation illustrated in FIG. 14 is realized by causing a CPU 301 to read a program stored in a HDD 304 to a RAM 303 and to execute the program.

First, in step S301, a reading unit 203 or a network interface 307 is controlled to input image data. The input image data is stored in the HDD 304.

In the present exemplary embodiment, the image data input in step S301 is rasterized in step S302. However, if the image data input in step S301 has been rasterized, the rasterization of the image in step S302 may be omitted.

This includes, for example, a case where the image data read by the reading unit 203 is input. In this case, the image data input in step S301 is written in an image memory 306 on a line-by-line basis in the x-axis direction without being rasterized in step S302.

In step S302, an image processor 305 is controlled to rasterize the image data input in step S301 from data of a page description language to bitmap data.

Figure 16:
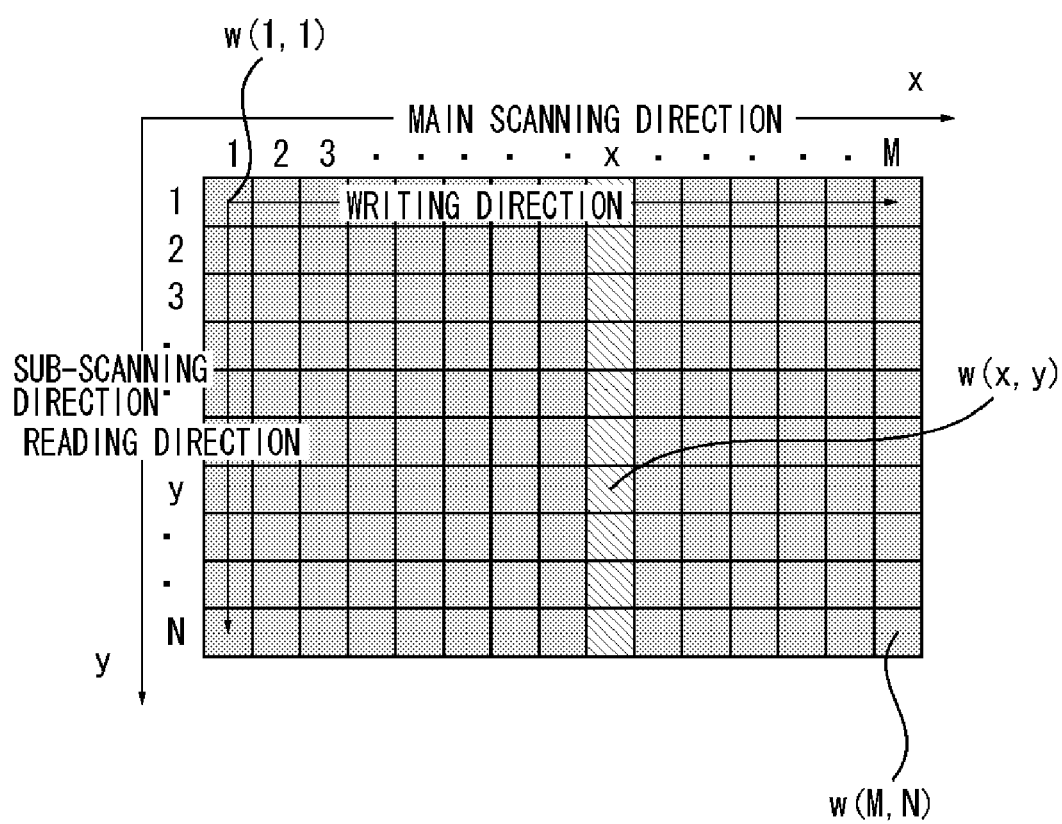
FIG. 16 illustrates a data structure of image data rasterized in step S302 of FIG. 14 according to the second exemplary embodiment.

The rasterized image data is written in the image memory 306 on a line-by-line basis in the x-axis direction (corresponding to a writing direction of FIG. 16). FIG. 16 illustrates a data structure of the image data rasterized in step S302.

The image data has coordinates of a two-dimensional matrix of $1 \leq x \leq M$ and $1 \leq y \leq N$. A value w (x, y) indicating brightness is stored corresponding to each coordinate. In step S302, a direction of writing the rasterized image data in the image memory 306 is a main scanning direction (direction parallel to the x axis) of an image, and this is repeated in a sub-scanning direction (direction parallel to the y axis) for each line.

In the present exemplary embodiment, correspondence between coordinates of each pixel of the image data and an address of the image memory 306 is represented as follows: "a"=k+(x−1)+M×(y−1), where "a" is an address of the image memory 306, k is an address of starting writing of the image data, and (x, y) is coordinates of each pixel of the image data (maximum value of x is M, and maximum value of y is N).

In other words, among pixels of the image data, pixels adjacent to each other in the x-axis direction are continuously stored in adjacent addresses in the image memory 306.

The present exemplary embodiment will be described by setting "w" to 256 gradations of $0 \leq w \leq 255$. However, "w" may be other gradations. In the case of w having gradations of 256 of $0 \leq W \leq 255$, "0" corresponds to black, and "255" corresponds to white.

The exemplary embodiment will be described by taking an example where an image is monochrome image. However, the image may be a color image. In the case of a color image, corresponding to each coordinate, a value r(x, y) indicating brightness of red, a value g(x, y) indicating brightness of green, and a value b(x, y) indicating brightness of blue are stored.

In step S303, an image processor 305 is controlled to execute correction processing for the image data rasterized in step S302. In the correction processing of step S303, the image data is read by a line unit from the image memory 306 in the y-axis direction (corresponding to a reading direction of FIG. 16).

Figure 17:
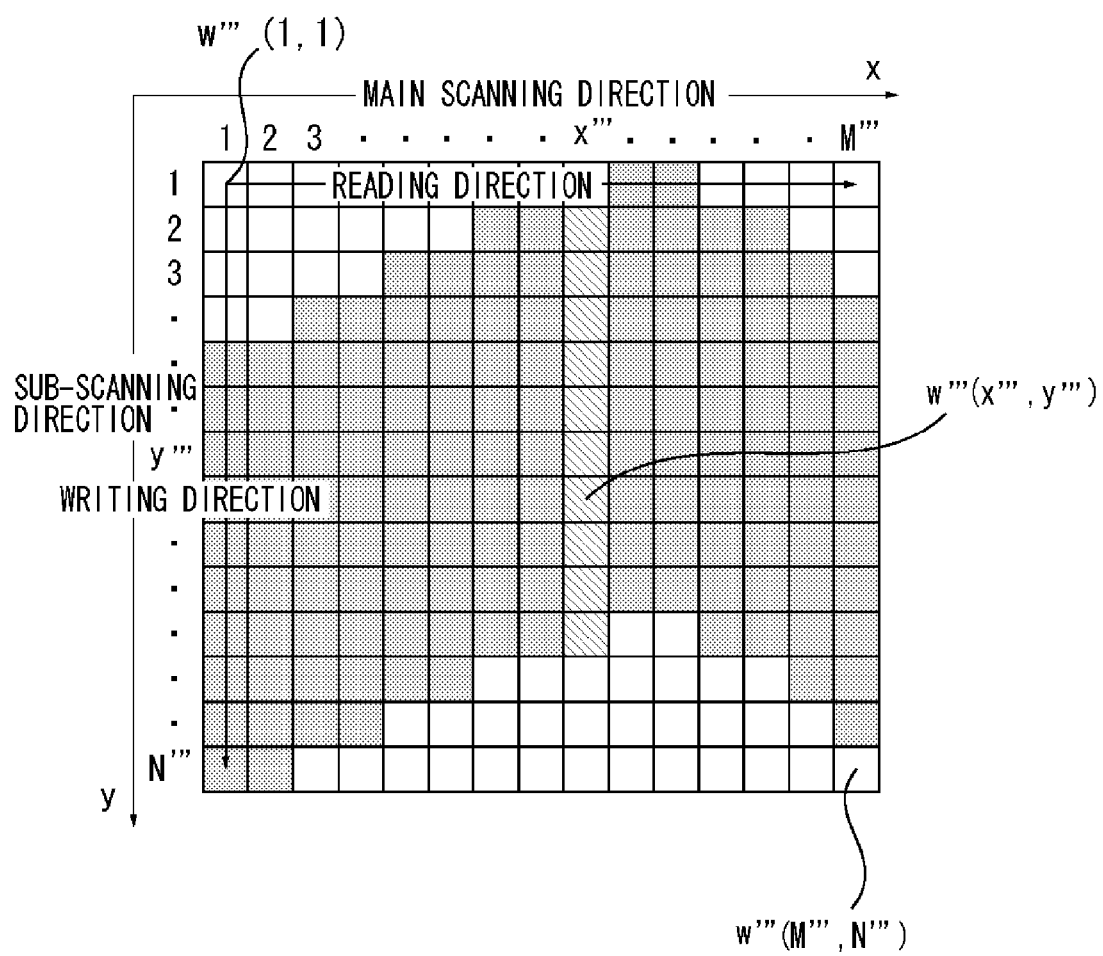
FIG. 17 illustrates a data structure of image data subjected to correction processing in step S303 of FIG. 14 according to the second exemplary embodiment.
Figure 18:
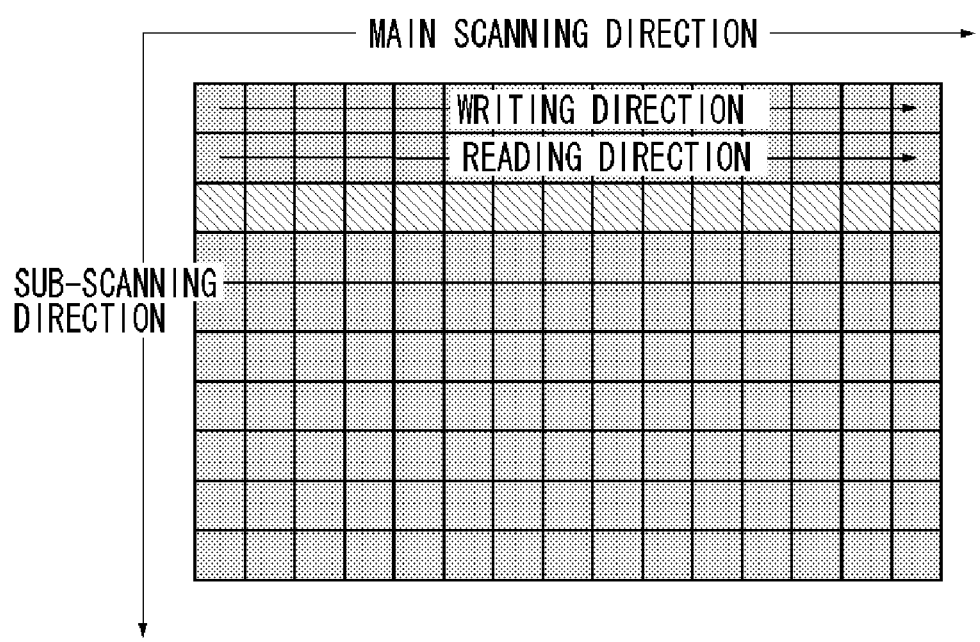
FIG. 18 illustrates a data structure of image data before it is subjected to correction processing according to a conventional art.
Figure 19:
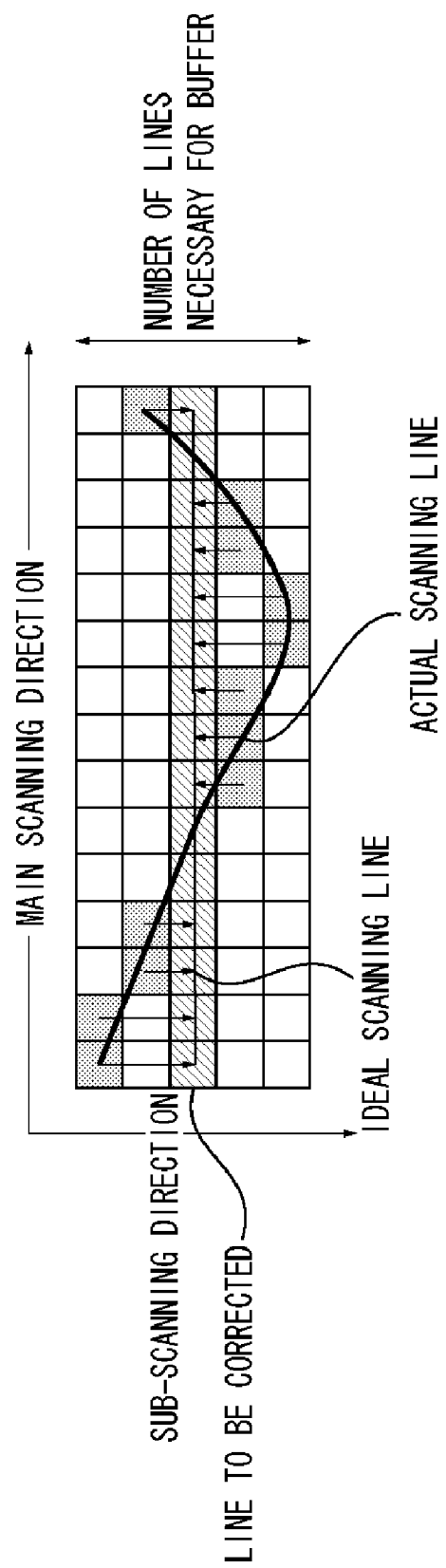
FIG. 19 illustrates a status where image data is subjected to correction processing at a specific line according to the conventional art.
Figure 20:
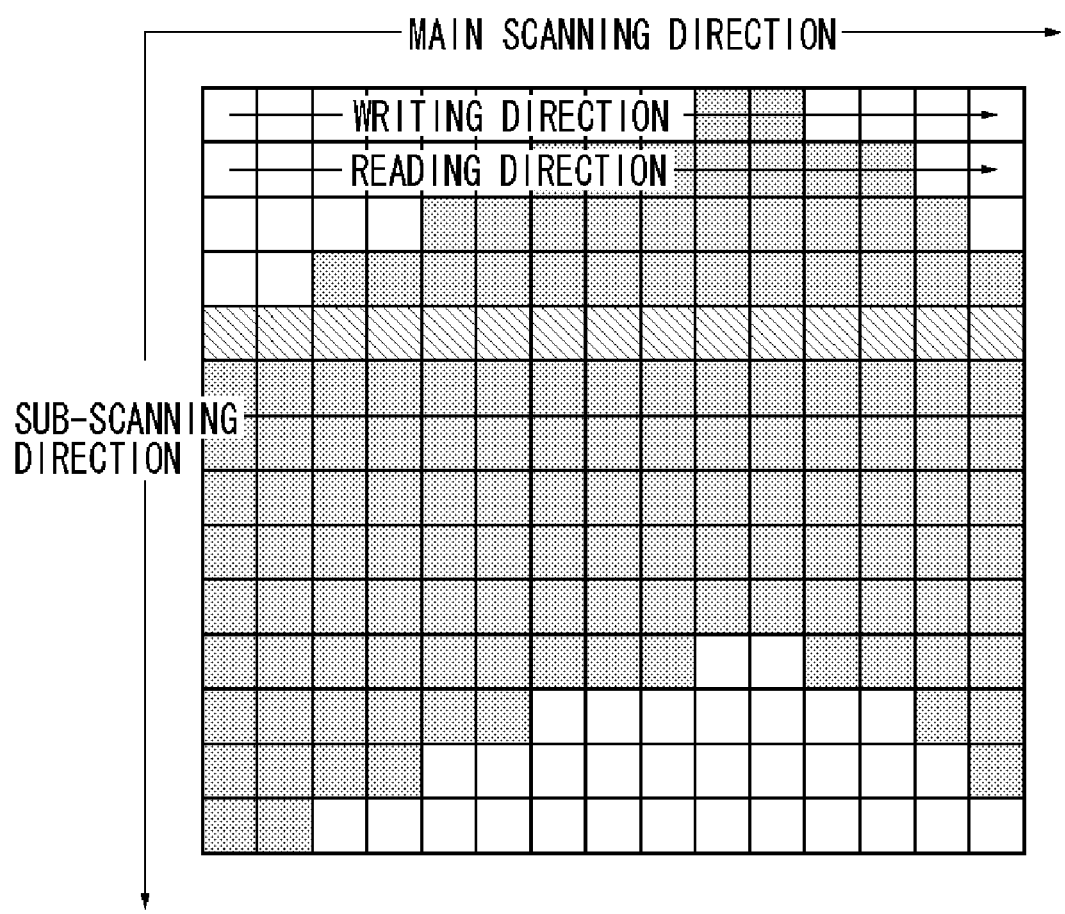
FIG. 20 illustrates a data structure of image data after it has been subjected to correction processing according to the conventional art.

The image data is temporarily stored in a line buffer (not illustrated), subjected to correction processing, and written on a line-by-line basis in the image memory 306 in the y-axis direction (corresponding to a writing direction of FIG. 17).

In step S303, a direction of reading the image data to be corrected from the image memory is a sub-scanning direction (direction parallel to the y axis) of an image, and this is repeated in a main scanning direction (direction parallel to the x axis) for each line. Step S303 will be described in detail referring to FIG. 15 below.

FIG. 17 illustrates a data structure of the image data corrected in step S303. The image data has coordinates of a two-dimensional matrix of $1 \leq x''' \leq M'''$ and $1 \leq y''' \leq N'''$, and each coordinate stores a corresponding value w'''(x''', y''') indicating brightness.

In step S303, a writing direction of the image data having corrected in the image memory 306 is a sub-scanning direction (direction parallel to the y axis) of an image, and this is repeated in a main scanning direction (direction parallel to the x axis) of an image for each line.

In step S304, a printing unit 204 is controlled to execute printing based on the image data corrected in step S303. The image data to be printed is read on a line-by-line basis from the image memory 306 in the x-axis direction (corresponding to a reading direction of FIG. 17).

In step S304, a direction of reading the image data to be printed from the image memory 306 is a main scanning direction (direction parallel to the x axis) of an image, and this is repeated in a sub-scanning direction (direction parallel to the y axis) for each line. The printing processing of step S304 is carried out under the control of the CPU 301 as follows.

First, an exposure unit 403 generates an electrostatic latent image on a photosensitive member 401 charged by a charging unit 402. A developing unit 404 develops the electrostatic latent image using a developer such as toner to generate a developer image. A sheet in a paper feed tray 406 is fed by a feeding operation of a sheet feed roller 407.

The photosensitive member 401 transfers the developer image to the sheet, and a fixing unit 405 fixes the developer image on the sheet. The sheet having the developer image fixed thereon by the fixing unit 405 is discharged to a discharge tray 410 by a discharging operation of a discharge roller 409.

Figure 15:
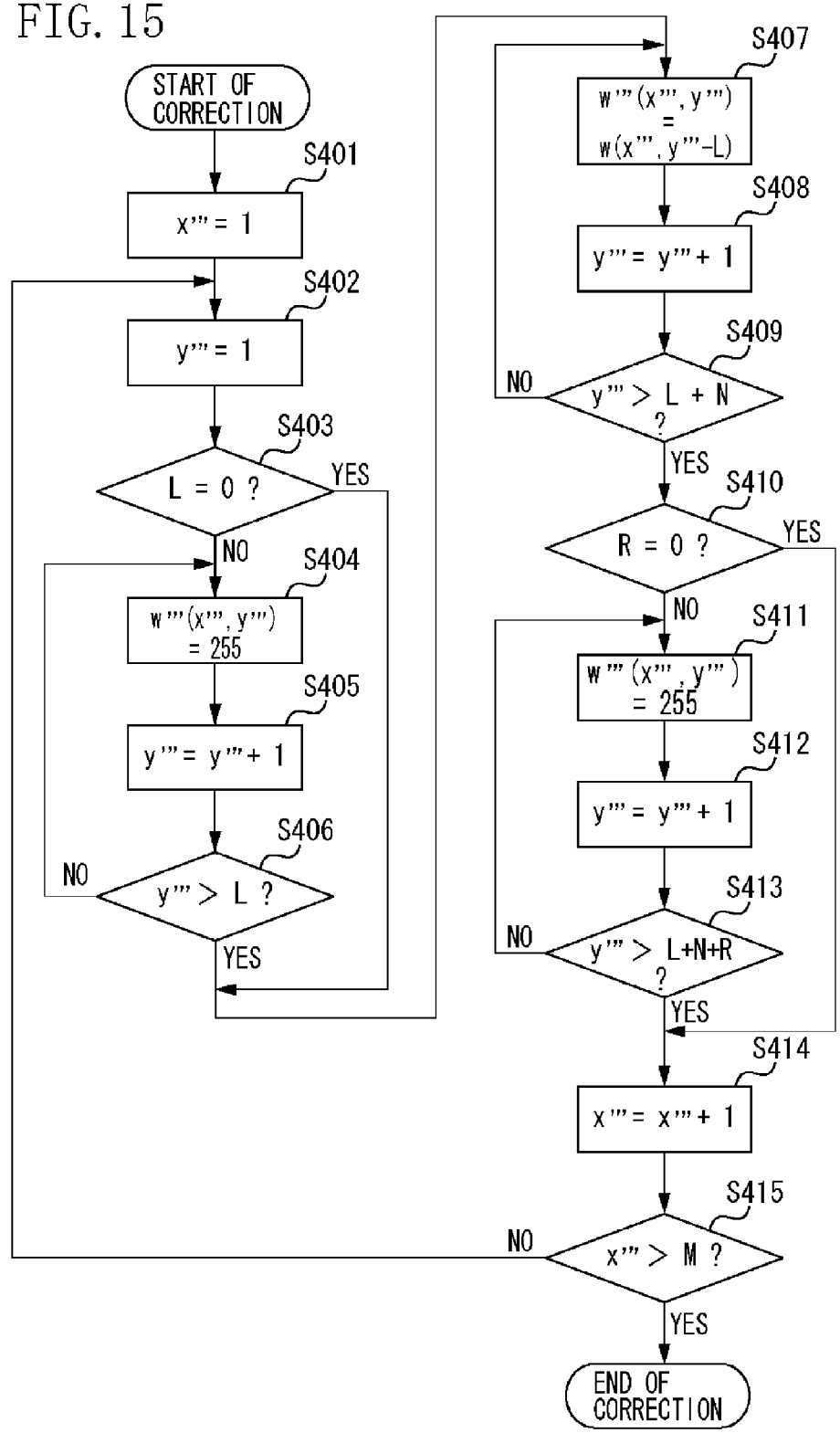
FIG. 15 is a flowchart illustrating correction processing in detail according to the second exemplary embodiment.

FIG. 15 is a flowchart illustrating the correction processing illustrated in step S303 according to the second exemplary embodiment in detail.

First, in step S401, "1" is substituted for x'". In step S402, "1" is substituted for y'". In step S403, whether L corresponding to x'" (equivalent to y" of the first embodiment as shown in FIG. 7B) is "0" is determined based on the correction information of FIG. 7B. If L corresponding to x'"(y") is determined to be "0" in step S403 (YES in step S403), then, the process proceeds to step S407. If L corresponding to x'" (y") is determined not to be "0" in step S403 (NO in step S403), then, the process proceeds to step S404.

In step S404, 255 representing white is substituted for w'" (x'", y'"). In step S405, y'" is incremented by 1.

In step S406, whether y'" is larger than L corresponding to x'" (y") is determined based on the correction information of FIG. 7B. If y'" is determined to be larger than L corresponding to x'"(y") in step S406 (YES in step S406), then, the process proceeds to step S407. If y'" is determined not to be larger than L corresponding to x'" (y") in step S406 (NO in step S406), the process returns to step S404.

In step S407, w(x'", y'"−L) is substituted for w'" (x'", y'"). In step S408, y'" is incremented.

In step S409, whether y'" is larger than a value obtained by adding L corresponding to x'"(y") and a maximum value N of y is determined based on the correction information of FIG. 7B. If y'" is determined to be larger than the value obtained by adding L corresponding to x'" (y") and the maximum value N of y in step S409 (YES in step S409), then, the process proceeds to step S410. If y'" is determined not to be larger than the value obtained by adding L corresponding to x'" (y") and the maximum value N of y in step S409 (NO in step S409), then, the process returns to step S407.

Repeating steps S407 to S409 enables sequential storage of values of w(x'", y'"−L) in w'"(x'", y'") with y'"=L+1 set as a head address and y'"=L+N set as a tail address at an x'" line.

In step S410, whether R corresponding to x'" (y") is "0" is determined based on the correction information of FIG. 7B. If R corresponding to x'" (y") is determined to be "0" in step S410 (YES in step S410), then, the process proceeds to step S414. If R corresponding to y" is determined not to be "0" in step S410 (NO in step S410), then, the process proceeds to step 411.

In step S411, 255 representing white is substituted for w'" (x'", y'"). In step S412, y'" is incremented by 1.

In step S413, whether y'" is larger than a value obtained by adding L corresponding to x'"(y"), the maximum value N of y, and R corresponding to x'" (y") is determined based on the correction information of FIG. 7B.

If y'" is determined to be larger than the value obtained by adding L corresponding to x'"(y"), the maximum value N of y, and R corresponding to x'" (y") in step S413 (YES in step S413), then the process proceeds to step S414. If y'" is determined not to be larger than the value obtained by adding L corresponding to x'"(y"), the maximum value N of y, and R corresponding to x'" (y") in step S413 (NO in step S413), then, the process returns to step S411.

In step S414, x'" is incremented.

In step S415, whether x'" is larger than a maximum value M of x is determined. If x'" is determined to be larger than the maximum value M of x in step S415 (YES in step S415), then, the processing ends. If x'" is determined not to be larger than the maximum value M of x in step S415 (NO in step S415), then, the process returns to step S402.

An advantage of the present exemplary embodiment is that when distortion of the scanning line of the laser beam is corrected, the number of line buffers used for correcting the image data can be reduced.

Another advantage of the present exemplary embodiment is that when distortion of the scanning line of the laser beam is corrected, the circuit used for correcting the image data can be configured simply and inexpensively.

A further advantage of the present exemplary embodiment is that since rotation processing necessary in the first exemplary embodiment can be omitted, the units necessary for rotation processing in the first exemplary embodiment can be reduced.

Embodiments of the present invention can be achieved by reading software programs (made of computer program code) for realizing the functions of the exemplary embodiments from the storage medium to execute them by the system or the apparatus.

In this case, the programs read from the storage medium realize new functions of the present invention, and the programs and the storage medium storing the programs constitute an embodiment of the present invention.

For a storage medium to supply program codes, for example, a flexible disk, a hard disk, a ROM, an optical disk, a magneto-optical disk, a compact disc (CD) ROM, a digital versatile disc (DVD) ROM, a DVD-RAM, a magnetic tape, or a memory card can be used.

A case where an OS operating on a computer executes a part or all parts of actual processing based on program instructions to realize the functions of the exemplary embodiments is within the scope of the present invention.

Furthermore, a case where a program is written in a memory installed in a function extension unit connected to a computer, and then a CPU installed in the function expansion unit executes a part or all of actual processing to realize the functions of the exemplary embodiments is within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-171744 filed Jun. 30, 2008, which is hereby incorporated by reference herein in its entirety.

What is claimed is:

1. An image processing apparatus comprising:
a storage unit;
an exposure unit configured to irradiate a photosensitive member with a beam according to image data;
an input unit configured to input image data on a line-by-line basis in a first direction of an image to write the image data in the storage unit;
a setting unit configured to set a writing start address for each line of the image data input by the input unit, the writing start address being based on information for correcting distortion of a scanning line created by the beam;
a correction unit configured to read the image data input by the input unit from the storage unit on a line-by-line basis in a second direction orthogonal to the first direction of the image, and execute correction processing to write the image data in the storage unit from the writing start address set by the setting unit on a line-by-line basis in the second direction of the image;

an output unit configured to read the image data corrected by the correction unit from the storage unit on a line-by-line basis in the first direction of the image to output the image data; and a control unit configured to control the exposure unit to irradiate a photosensitive member with a beam according to the image data output by the output unit.

2. The image processing apparatus according to claim 1, further comprising:

a first conversion unit configured to convert, for each pixel of the image data input by the input unit, an address to change a coordinate of the first direction and a coordinate of the second direction into each other; and a second conversion unit configured to convert, for each pixel of the image data corrected by the correction unit, an address to change the coordinate of the first direction and the coordinate of the second direction into each other.

3. The image processing apparatus according to claim 1, wherein the writing start addresses for each line set by the setting unit are different from each other.

4. The image processing apparatus according to claim 1, wherein the correction unit is configured to write image data indicating white pixels in the storage unit having addresses up to the writing start address.

5. The image processing apparatus according to claim 1, further comprising a reading unit configured to read an image, wherein the input unit is configured to input image data of the image read by the reading unit.

6. The image processing apparatus according to claim 1, further comprising a reception unit configured to receive image data from an external apparatus, wherein the input unit is configure to input the image data received by the reception unit.

7. The image processing apparatus according to claim 1, further comprising:

a developing unit configured to develop using a developer an electrostatic image formed on the photosensitive member by the irradiation with the beam by the exposure unit; and a transfer unit configured to transfer a developer image developed by the developing unit to a sheet.

8. The image processing apparatus according to claim 7, further comprising a fixing unit configured to fix the developer image transferred by the transfer unit on the sheet.

9. The image processing apparatus according to claim 1, wherein the correction unit is configured to correct distortion of a scanning line created by the beam being applied to the photosensitive member by the exposure unit.

10. The image processing apparatus according to claim 1, wherein, the first direction corresponds to a main scanning direction of the beam irradiated by the exposure unit; and the second direction corresponds to a sub-scanning direction of the beam irradiated by the exposure unit.

11. The image processing apparatus according to claim 1, wherein the information for correcting the distortion of the scanning line used by the setting unit comprises a number of pixels of each line of the input image data by which the scanning line is deviated from an ideal scanning line when applied to said each line of the input image data.

12. A method for controlling an image processing apparatus with a storage unit and exposure unit configured to irradiate a photosensitive member with a beam according to image data, the method comprising:

inputting image data on a line-by-line basis in a first direction of an image to write the image data in the storage unit;

setting a writing start address for each line of the input image data based on information for correcting distortion of a scanning line created by the beam;

reading the input image data from the storage unit on a line-by-line basis in a second direction orthogonal to the first direction of the image, and executing correction processing to write the image data in the storage unit from the set writing start address on a line-by-line basis in the second direction of the image;

reading the corrected image data from the storage unit on a line-by-line basis in the first direction of the image to output the image data;

controlling the exposure unit to irradiate a photosensitive member with a beam according to the output image data.

13. A non-transitory storage medium having stored thereon computer program code which, when executed on a computer, causes the computer to carry out the method of claim 12.

* * * * *